United States Patent [19]
Boone

[11] 3,891,391
[45] June 24, 1975

[54] FLUID FLOW MEASURING SYSTEM USING IMPROVED TEMPERATURE COMPENSATION APPARATUS AND METHOD

[76] Inventor: George R. Boone, 4730 Ridgebury Dr., Dayton, Ohio 45440

[22] Filed: May 14, 1973

[21] Appl. No.: 360,134

[52] U.S. Cl. .................................................. 73/204
[51] Int. Cl............................ G01f 1/00; G01p 5/10
[58] Field of Search ................................... 73/3, 204

[56] References Cited
UNITED STATES PATENTS

| | | | |
|---|---|---|---|
| 3,085,431 | 4/1963 | Yerman et al. | 73/204 |
| 3,220,255 | 11/1965 | Scranton et al. | 73/204 |
| 3,363,462 | 1/1968 | Sabin | 73/204 |
| 3,372,590 | 3/1968 | Sterling | 73/204 |
| 3,765,239 | 10/1973 | Olsson | 73/194 |
| 3,800,592 | 4/1974 | Jones, Jr. | 73/204 |

*Primary Examiner*—Herbert Goldstein

[57] ABSTRACT

Fluid flow measuring apparatus employing a self-heated thermal element which is compensated for fluid temperature variations is disclosed. The apparatus utilizes electrical circuitry for separating a flow related component from the thermal element signal in order that improved temperature compensation can be applied. A method for tailoring circuitry to perform the signal separation and for accurately temperature compensating the sensitivity of the measuring system to the fluid temperature is also shown.

29 Claims, 8 Drawing Figures

PATENTED JUN 24 1975  SHEET 1  3,891,391
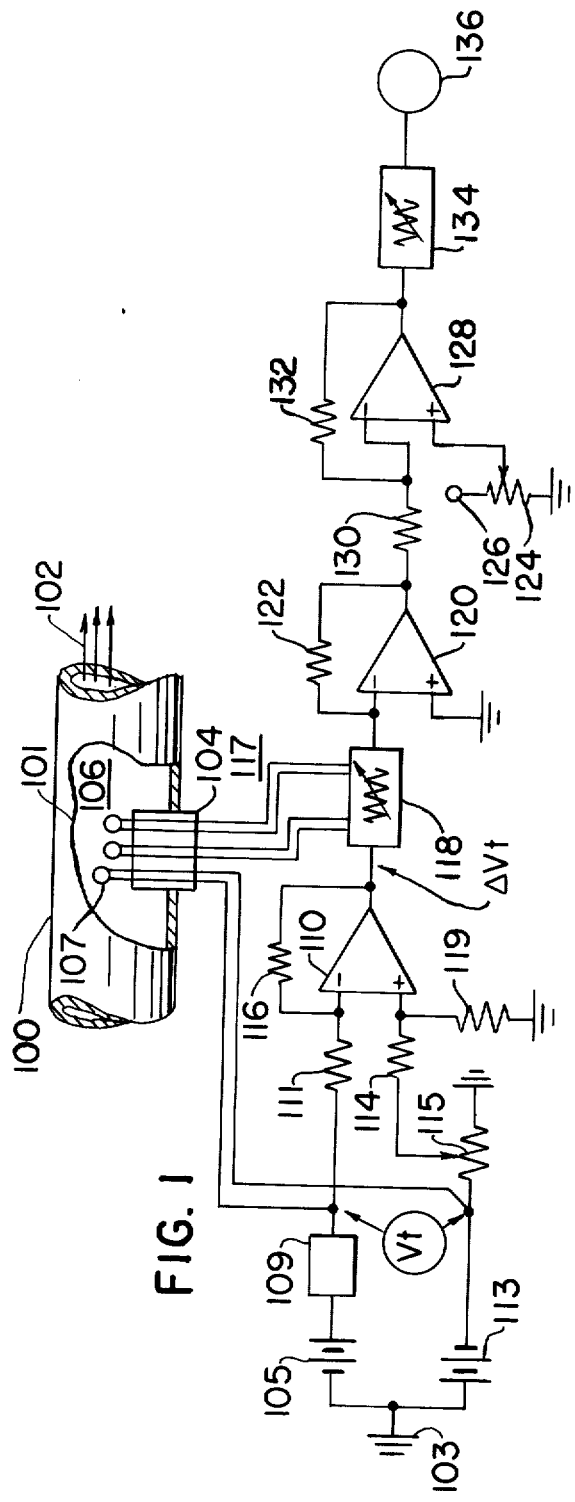
FIG. 1
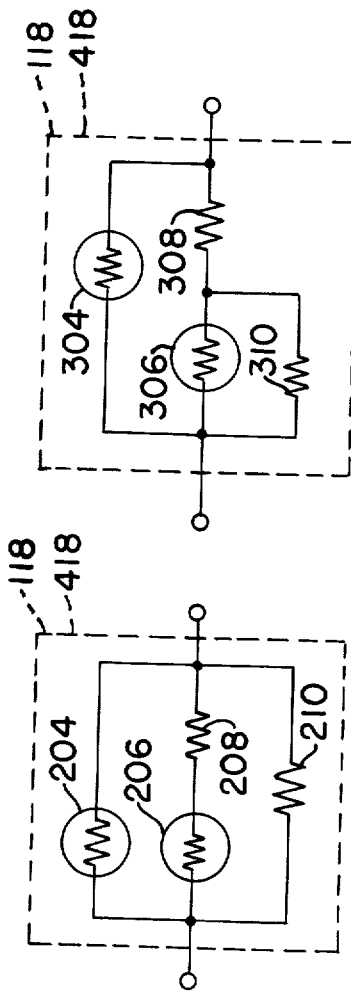
FIG. 3
FIG. 2
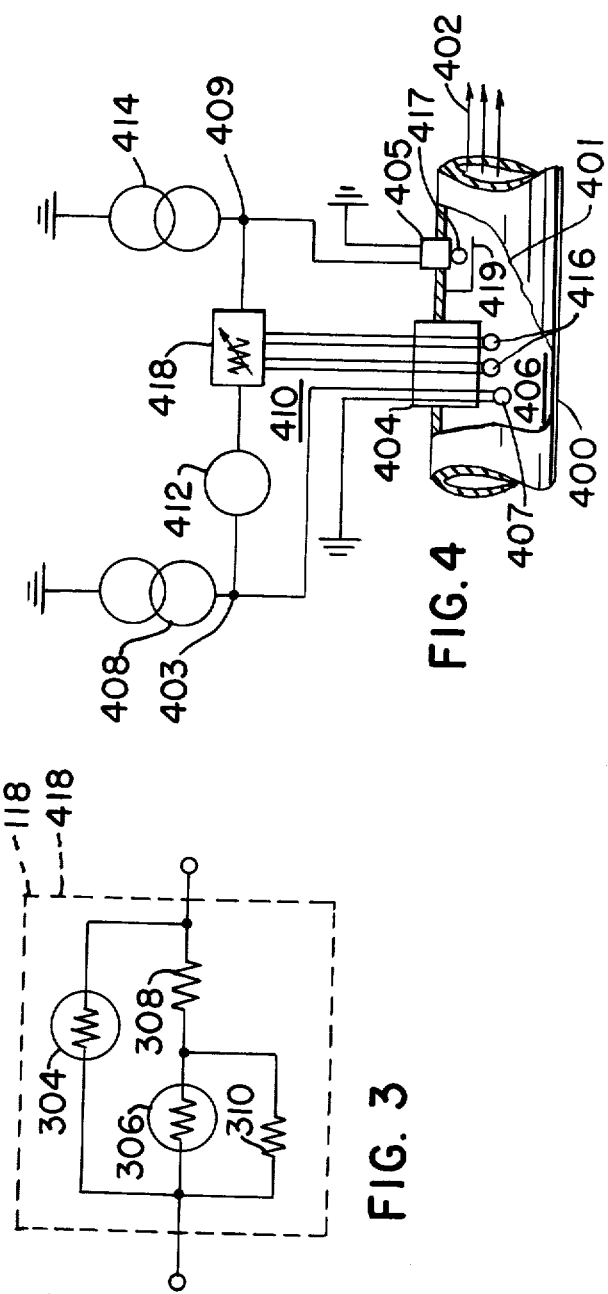
FIG. 4

3,891,391

FLUID FLOW MEASURING SYSTEM USING IMPROVED TEMPERATURE COMPENSATION APPARATUS AND METHOD

BACKGROUND OF THE INVENTION

1. Field of the Invention

This invention relates to fluid flow measuring systems of the type involving an electrically heated thermal element that is located in a fluid stream and cooled in response to the rate of fluid movement in the stream.

2. Description of the Prior Art

Fluid flow measuring systems of the heated sensing element type which compensate for the temperature of the fluid being measured are known in the art. Examples of this prior art are found in the following patents:

In U.S. Pat. No. 3,220,255 issued to R. S. Scranton et al. on Nov. 30, 1965, there is described a thermistor flow measuring apparatus which employs a bridge circuit and thermistors of the positive temperature coefficient type to perform compensation for fluid temperature.

In U.S. Pat. No. 3,372,590 issued to J. J. Sterling on Mar. 12, 1968, there is shown a thermistor flow measuring apparatus which employs a source of constant current, a source of constant voltage and one or more negative temperature coefficient thermistor elements which provide compensation for the temperature of the fluid being measured.

In U.S. Pat. No. 2,831,351 issued to M. G. Jacobson on Apr. 22, 1958, there is shown a mass flow measuring apparatus which employs an electrical bridge circuit and a plurality of thermistor elements which are located in the fluid path but are responsive only to the temperature of the fluid in conjunction with a deflecting vane sensor of fluid flow rate for compensating a flowmeter output signal for both fluid temperature and fluid flow rate.

In U.S. Pat. No. 2,694,928 issued to M. G. Jacobson on Nov. 23, 1954, there is shown an electrical system for measuring fluid motion which is similar to that of the U.S. Pat. No. 2,831,351 except that a positive temperature coefficient thermistor element is used to change the sensitivity of the instrument in accordance with the quantity of fluid flowing.

It has been found that the prior art mass flow measuring systems including those of the above patents have construction features and performance limitations which severely limit their usefulness in many applications. It has especially been found that prior art mass flow measuring systems are incapable of accurately measuring fluid flow over the temperature range needed if mass flow measuring equipment is to be employed in controlling the fuel to air ratio and reducing undesirable particulate and gaseous emissions from the automobile engine.

It is also found that none of the prior art mass flow measuring systems recognizes the improvements in calibration accuracy and temperature range which result when the flow dependent component of a thermal element signal is separated from the remaining thermal element signal components both prior to, and independently of, the circuitry which compensates the system for temperature induced sensitivity changes.

It is also found that none of the prior art mass flow measuring apparatus incorporates a temperature responsive electrical network capable of accurately conforming the flow-meter sensitivity to the required value over a wide range of temperatures.

It is also found that many prior art mass flow measuring apparatus are limited by the incorporation of an electrical bridge circuit. Many of these prior art flow measuring systems also do not operate the sensing thermal element in the constant current mode. The U.S. Pat. No. 3,372,590 of J. J. Sterling is a notable exception to this bridge circuit and constant current source limitation.

BRIEF SUMMARY OF THE INVENTION

In the present invention, signals generated in a constant current excited self-heated thermal element such as a thermistor are corrected for the presence of a non-flow related signal and then adjusted in magnitude according to the temperature of the fluid being measured with each of these operations being accomplished at a separate location in the circuitry. The electrical network employed in the signal magnitude adjusting circuitry is conformed to the characteristics of the flow sensing thermistor and its environment according to a novel method which takes advantage of regularity found in the curves relating thermistor output signal, flow rate and fluid temperature. The electrical network used to conform the signal magnitude or the instrument sensitivity to the required value is particularly suited to this function.

In particular it is an object of the present invention to provide an instrument capable of measuring and indicating mass flow rate of a fluid over a wide range of temperatures.

It is also an object of the present invention to provide a mass flow measuring instrument that is capable of accurately measuring the flow of fluids existing in the liquid and the gaseous state.

Another object of the present invention is to provide a mass flow measuring instrument which provides the combined advantages of ease of calibration, increased accuracy, and low manufacturing cost.

Yet another object of the present invention is to provide an accurate measuring system which is adaptable to service as an indicator of fluid mass flow or fluid velocity.

BRIEF DESCRIPTION OF THE DRAWINGS

FIG. 1 of the drawings shows a flow measuring apparatus made according to the present invention.

FIG. 2 of the drawings shows an electrical schematic diagram of an electrical resistance network usable for compensating the sensitivity of a fluid flow measuring apparatus to changing fluid temperatures.

FIG. 3 of the drawings shows an electrical schematic diagram of a second electrical resistance network usable for compensating the sensitivity of a fluid flow measuring apparatus to changing fluid temperatures.

FIG. 4 of the drawings shows an alternate embodiment of a flow measuring apparatus made according to the present invention.

DETAILED DESCRIPTION OF INVENTION

Figure 5:
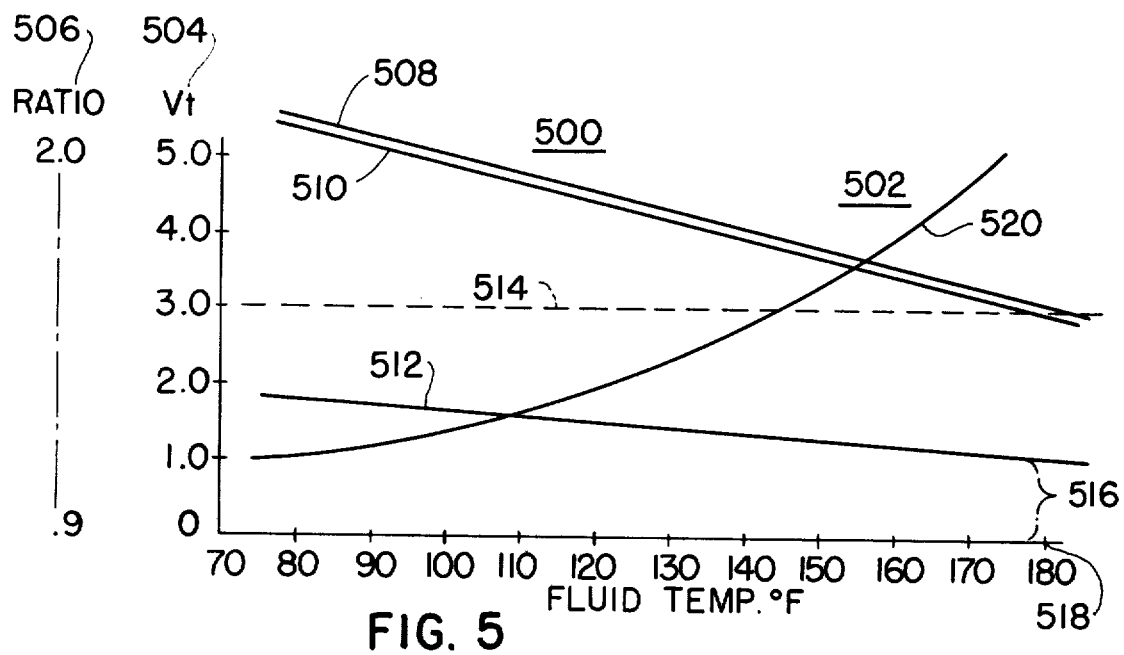
FIG. 5 of the drawings shows two sets of temperature related curves used in tailoring the response of a gain controlling network to the sensitivity requirements of a flow measuring apparatus.

In the FIG. 1 fluid mass flow measuring or flow metering apparatus the arrows 102 represent fluid which is flowing through a conducting member 100 which has inserted therein a group of thermistor elements (or other thermal elements) 106 that are mounted on a probe 104. The fluid conducting member 100 is shown cut away at the line 101 in order that the thermistor elements 106 be visible. Although not shown in FIG. 1, it is intended that the conducting member 100 be thermally insulated from its surroundings or be fabricated from material having low thermal conductivity such as for example polyvinyl chloride in order that thermal gradients within the fluid flowing therein be minimized.

In addition to the members of the FIG. 1 apparatus relating to the fluid flow indicated by the arrows 102, the FIG. 1 apparatus also includes an electronic circuit incorporating operational amplifiers 110, 120 and 128, a constant current regulator circuit 109, a source of electrical energy such as the batteries 105 and 113 and a plurality of resistor elements 111, 114, 119, 115, 116, 122, 130 and 132 all of which are connected to the various operational amplifiers. The FIG. 1 apparatus also includes a sensitivity compensating temperature responsive network 118 which is connected to a second operational amplifier 120 and a source of zero flow compensating signal 124 which is connected to a third operational amplifier 128 and a function generator apparatus 134 which may be connected between the third operational amplifier 128 and a signal utilization device or indicating device or working member 136. (The function generator apparatus 134 may be omitted from some embodiments of the FIG. 1 apparatus where a non-linear output display is acceptable in the signal utilizing device 136.)

The flow sensitive element 107 (which is alternately identifiable as a thermal element or a thermistor) is connected between the battery 113 and the constant current regulator circuit 109 in FIG. 1; this element may be a negative temperature coefficient device which is capable of operating in the self-heated mode in the region beyond the peak of its voltage versus current or E-I characteristic curve. A glass bead thermistor element having a room temperature resistance near 10 kiloohms has been found convenient for use as the element 107 in an air adapted mass flow measuring apparatus made according to the present invention, although other resistance values and other types of mounting including glass probes can be employed. Thermistors suitable for use in the FIG. 1 apparatus are available commercially from several sources including Victory Engineering Corporation, Springfield, New Jersey, and Fenwal Electronics Inc., 63 Fountain Street, Framingham, Massachusetts, 01701 Thermistor operation in the self-heated mode is described in the publication, *Thermistor E-I Curve Manual, Thermistor Operation in the Self-Heated Mode*, published by Fenwal Electronics with one edition of the publication being dated May, 1970.

In the FIG. 1 apparatus the element 107 which may be a thermistor is used to generate a flow responsive voltage which is labeled $V_T$ (for Thermistor voltage). The thermistor 107 and the voltage $V_T$ are the primary source of signals for the FIG. 1 apparatus. The signal generating thermistor 107 in FIG. 1 is shown to extend into the fluid stream by a greater amount than do the remaining thermistor elements in the group 106 in order that the signal generating thermistor be exposed to an un-interrupted part of the fluid stream rather than a part which is disturbed by the reamining thermistor or thermal elements.

The magnitude of current flow in the thermistor 107 in FIG. 1 is determined by the constant current regulator circuit 109 which may incorporate an amplifier regulating circuit of the type that is known in the art. The current supplied by the constant current rgulator 109 to the thermistor 107 may be of any convenient magnitude, however a value near 7 milliamperes or a value generally in the range of 3 to 20 milliamperes has been found convenient for use with the 10 kilo-ohm thermistor mentioned previously when this thermistor is exposed to gaseous fluids. When liquid fluids are measured by the system it is found that currents up to 100 milliamperes may be required for exciting the sensing thermistor element since the liquid fluids conduct a larger quantity of heat away from the thermistor or thermal element structure.

For self-heated negative temperature coefficient thermistor elements in a constant current fluid flow measuring apparatus of the type shown in FIG. 1, power dissipation $(P_R)$, fluid temperature $(T_R)$ and fluid mass flow rate $M$ are related by an equation having the form of:

$$\Delta P_R = K_R (A_R + B_R M^{1/n}) \Delta T_R$$

(1)

where:

$\Delta P_R =$ the change in thermistor power dissipation due to fluid flow at a fluid temperature of $T_R$ degrees. For general flow usage this usually represents $(P_{T_R} - P_{O_R})$ or $(P_{T_R} - C)$; with $P_{T_R}$ being total power dissipated by the thermistor, with $P_{O_R}$ being power dissipated with no fluid through the fluid conducting member, with $C$ being a constant, and with the $R$ subscript indicating the "Reference" $T_R$ temperature.

$A_R$ and $B_R =$ functions of fluid properties at fluid temperature $T_R$ and thermistor temperature $T_T$.

$K_R =$ thermal properties of the fluid at temperature $T_R$ (primarily the thermal conductivity plus physical constants of the system)

$M =$ the fluid mass flow rate, (proportional to the product of fluid density and velocity, $pV$)

$N =$ an exponent determined by fluid properties and physical dimensions of the measuring system $\Delta T_R =$ temperature difference between thermistor and fluid, generally given as $(T_T -0\ T_R)$ where $T_T$ is the temperature of the self-heated thermistor element subjected to a fluid at the temperature $T_R$ degrees and flowing at the rate of $M$.

If the fluid temperature in equation (1) is changed to $T_S$ degrees, the thermistor signal will take on some new value $\Delta P_S$ which is predicted by the relationship:

$$\Delta P_S = K_S (A_S + B_S M^{1/n}) \Delta T_S \quad (2)$$

Where the terms $M$ and $N$ are as defined above and where $K_S$, $A_S$ and $B_S$ are as defined above except taken at fluid temperature $T_S$.

$\Delta P_S$ = change in thermistor power dissipation due to fluid flow at a fluid temperature of $T_S$ degrees, generally $(P_{T_S} - P_{O_S})$ or $(P_{T_S} - C)$ with the subscript $S$ indicating the $T_S$ temperature and the subscripts $T$ and $O$ being as defined above.

$K_S$ = thermal properties of the fluid at temperature $T_S$ (primarily the thermal conductivity plus physical constants of the system)

$\Delta T_S$ = temperature difference between thermistor and fluid generally given as $(T_T - T_S)$ where $T_T$ is the temperature of the self-heated thermistor element while subjected to fluid at the new temperature of $T_S$ degrees and flowing at the rate of $M$.

By mathematical manipulation it is possible to obtain from equations (1) and (2) a convenient expression which relates the change in thermistor power dissipation with one fluid temperature to the change in thermistor power dissipation with a second fluid temperature. although this expression is based upon equations (1) and (2) which contain such terms as $A$, $B$, $K$ and $N$ which are related to the properties of the fluid and the particular mass flow measuring system employed and usually require empirical evaluation, the general nature of the resulting expression is nevertheless fundamental for designing flow measuring systems. In practice it is found that the general nature of the expression obtained from equations (1) and (2) rather than its precise mathematical content is useful in embodying flow measuring systems.

In order to realize a practical flow measuring apparatus, it is desired to obtain from equations (1) and (2) a factor which can be used to operate upon the thermistor power dissipated at any fluid temperature in order to predict what power the same thermistor in the same structural environment would have dissipated at some other standard or reference fluid temperature. It is therefore desirable to form from equations (1) and (2) an expression wherein one temperature related quantity is made equal to a second temperature related quantity by a multiplying factor. An expression of this type can be formed from equations (1) and (2) if each of these equations is solved for $M^{1/n}$ and the two resulting expressions set equal to each other in accordance with the flowing mass being equal at the two different temperatures. When the two expressions are set equal and the resulting equation algebraically reduced there results the following equation:

$$\Delta P_R = \Delta P_S \left( \frac{K_R \Delta T_R B_R}{K_S \Delta T_S B_S} \right) + \left( \frac{A_R}{B_R} - \frac{A_S}{B_S} \right) \quad (3)$$

$(K_R \Delta T_R B_R)$ | for $M$ = constant

If $A_R/B_R$ is equal to $A_S/B_S$ or if we assume that the difference between these fractions is small in comparison to the other terms, then equation (3) reduces to:

$$\Delta P_R = \Delta P_S \left( \frac{K_R \Delta T_R B_R}{K_S \Delta T_S B_S} \right) \quad | \text{ for } M = \text{constant} \quad (4)$$

Upon replacing the terms $\Delta P_R$ and $\Delta P_S$ with the quantities $(P_{T_R} - C)$ and $(P_{T_S} - C)$, as defined in connection with equation (1) above, equation (4) becomes:

$$P_{T_R} - C = \left( \frac{K_R \Delta T_R B_R}{K_S \Delta T_S B_S} \right) (P_{T_S} - L) \quad | \text{ for } M = \text{constant} \quad (5)$$

Since it is more convenient in flow measuring apparatus to work with voltage signals than with power signals and since equation (5) is derived on the basis of constant current thermistor excitations, it is possible to divide both sides of equation (5) by a current term to obtain a relationship applicable to voltage signals $$V_{T_R} - C' = \frac{K_R \Delta T_R B_R}{K_S \Delta T_S B_S} (V_{T_S} - C') = G_S (V_{T_S} - C' \quad (6)$$

| for $M$ = constant

Where $V_{T_R}$ and $V_{T_S}$ are related to $P_{T_R}$ and $P_{T_S}$ by the factor of $I$ or current and where $C'$ is related to $C$ by the factor of $I$ or current.

Equation (6) states that at any constant mass flow rate if some constant voltage $C'$ is always subtracted from the total thermistor voltage at any fluid temperature then the desired signal, one equal to that produced by the thermistor when it is immersed in a fluid at some reference first temperature, can be obtained from the thermistor signal generated at some other second temperature, if the second temperature thermistor signal is multiplied by a correcting or sensitivity or gain factor. Equation (6) shows that this sensitivity or gain factor $K_R \Delta T_R B_R / K_S \Delta T_S B_S$ or $G_S$ is responsive to the difference in fluid properties at the two temperatures and to the difference between thermistor temperature and fluid temperature at the two different fluid temperatures.

By similar reasoning to the foregoing, it can be shown that $$V_{T_R} - V_{O_R} = \frac{K_R \Delta T_4 B_R}{K_S \Delta T_S B_S} (V_{T_S} - V_{O_S}) \quad | \text{ for } M = \text{constant} \quad (7)$$

where $V_{O_R}$ and $V_{O_S}$ are derived from $P_{O_R}$ and $P_{O_S}$ by dividing by a constant current as described above.

Once the nature of equation (6) is recognized, especially the fact that it incorporates the constants $C'$, it is found that experimental data available from a particular flow measuring apparatus can be employed to evaluate the $K_R \Delta T_R B_R / K_S \Delta T_S B_S$ gain factor without the need for determining a value for each term which is included in this gain factor.

Furthermore, if this gain factor is to be used for temperature compensation, it is necessary that it be independent of flow, that is $$\frac{V_{TR1} - C'}{V_{TS1} - C'} = \frac{V_{TR2} - C'}{V_{TS2} - C'} = \frac{V_{TRN} - C'}{V_{TSN} - C'} = G_S \qquad (8)$$

where the different subscripts 1, 2 and N refer to different flow values.

In practice it is found that a sensitivity factor having temperature dependence which suitably resemble that of the $K_R \Delta T_R B_R / K_S \Delta T_S B_S$ expression can be generated by fitting the temperaturre versus resistance curves of a selected electrical network which includes non self-heated fluid temperature sensing thermistor elements to the characteristics of the self-heated flow responsive thermistor element. As suggested by equations (6) and (8) however, the gain compensation or sensitivity adjustment accomplished by this curve fitting is found to be most satisfactory when a constant or offset correcting voltage corresponding approximately to the thermistor no flow voltage is first subtracted from the self-heated thermistor signal voltage.

It is feasable in a practical situation once the nature of equation (8) is known, to evaluate from experimental data the magnitude of this constant, the constant $C'$ which is to be subtracted from the thermal element voltage signals relating to each fluid temperature considered. The constant $C'$ has the effect of introducing a non-flow responsive component into the thermal element voltage signals; the presence of this non-flow responsive component prevents the thermal element voltage signals from displaying an otherwise notable degree of uniformity, (wherein the ratio of thermal element voltage at a given flow rate and first fluid temperature to the thermal element voltage at the same flow rate and a second fluid temperature is substantially the same regardless of the quantity of fluid flowing). Therefore, one method of evaluating the constant $C'$ involves simply selecting a value such that a maximum degree of uniformity is displayed by the data remaining after $C'$ is subtracted from the thermal element voltages. (This involves selecting $C'$ to have a value such that the ratio of remaining signals at a given flow rate and any two fluid temperatures varies by a minimum amount as the fluid flow rate is altered.) In practice it is found that regularity of the curves describing the thermal element voltage data is such that at least an approximate or initial value of $C'$ can be computed by equating the ratio of voltages at selected points of the data. These methods of evaluating both the approximate starting value and the final desired value for $C'$ are illustrated by example below.

A set of curves representing the self-heated flow responsive characteristics of the thermistor element 107 in FIG. 1 is shown in FIG. 5 of the drawings. The first family of curves in FIG. 5, the family shown at 500, is typical of the voltage $V_T$ in FIG. 1 for one particular type of fluid and for one particular temperature range when the 10 kilo-ohm thermistor and the 7 milliamperes current source previously mentioned are employed. The curves of FIG. 5 are typical of those found with air flowing over a temperature range of 70° to 180° Fahrenheit. Curves similar to those shown in FIG. 5 may be obtained for other types of fluid and other temperature ranges. The curve 508 in FIG. 5 is typical of the curves found with air flowing at a rate of 1000 pounds per hour in a 3-inch diameter conduit while the curve 510 is typical of air flowing at a rate of 880 pounds per hour in a 3-inch diameter conduit and the curve 512 is typical of a flow of 0 pounds of air per hour. Other curves representing flow rates between zero and 1000 pounds per hour or greater than 1000 pounds per hour may, of course, be inserted into the FIG. 5 drawing when such smaller or larger flow rates are of interest.

The non-linear decrease of thermistor voltage $V_T$ in the family 500 in FIG. 5 with increasing fluid temperature is well known in the art of flow measuring apparatus design and has been found to be the result of several factors including the tendency of the self-heating temperature of the thermistor element 107 in FIG. 1 to approach the temperature of the fluid indicated by the arrows 102 as the temperature of the fluid is increased. In the constant current mode the thermistor element 107 is normally operated at a temperature considerably above that of the fluid at ambient temperature, however as the temperature of the fluid is increased, the temperature difference between the thermistor element 107 and the fluid grows successively smaller and the resulting heat transfer between the thermistor element 107 and the fluid also decreases accordingly.

The constant voltage line 514 in FIG. 5 depicts the signal output which is desired for one rate of fluid flow in an ideal flow measuring instrument. As indicated by the constant voltage line 514, it is desirable that the thermistor or other temperature sensitive element used in the instrument provide a signal voltage which is non-varying as the temperature of the fluid being measured is changed. In practice it has not been found possible to realize a constant output directly from a thermistor or any other temperature responsive element in a flow measuring environment.

Figure 6:
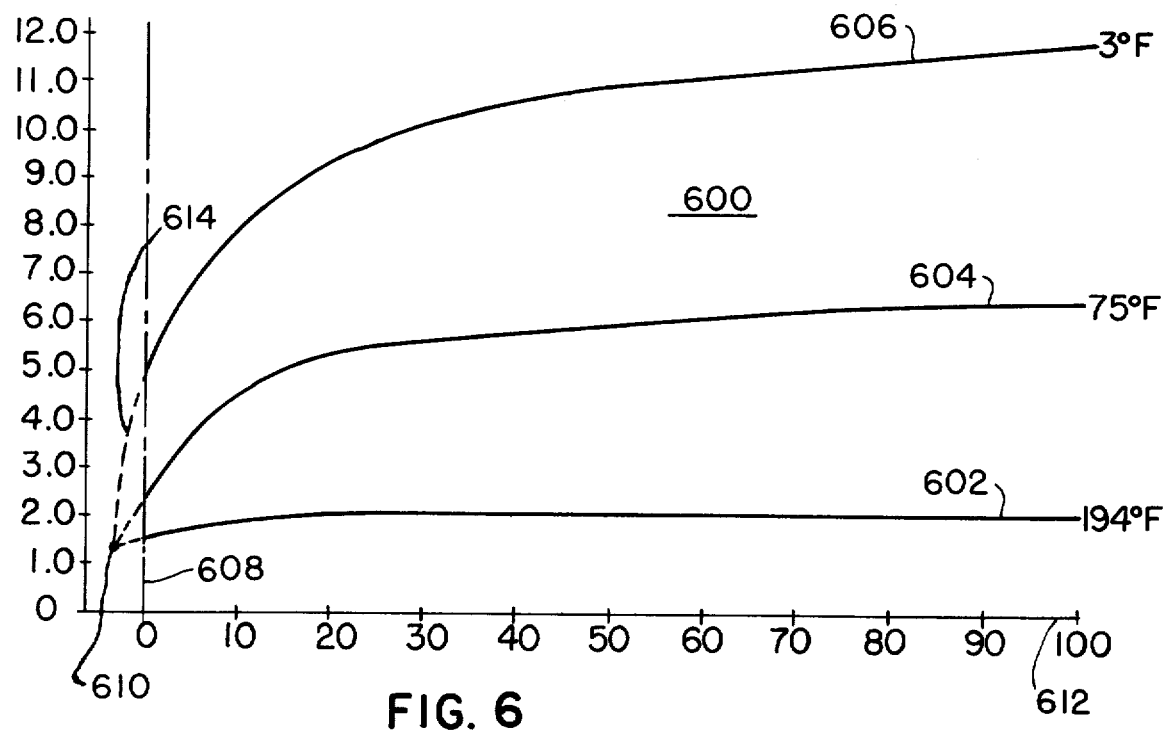
FIG. 6 of the drawings shows an alternate set of curves which define the characteristics of a thermally responsive element fluid measuring system.

In FIG. 6 of the drawings there is shown a family of curves which are similar to the family 500 in FIG. 5 with the exception that the position of the temperature and the flow rate variables are interchanged. In the FIG. 5 family 500 the points along each of the curves 508, 510, 512, etc. represent thermistor voltages for a constant flow rate as the fluid temperature is altered. In the FIG. 6 drawing each point along the curves 602, 604, 606 represents thermistor voltages for a constant temperature as the fluid flow rate varies.

although the curves of FIG. 5 and FIG. 6 could be obtained from the same thermistor fluid flow data (table 1 which is shown in a subsequent part of this specification for instance) the data represented by the FIG. 6 curves was obtained from a small glass probe mounted thermistor element rather than the bead thermistor element employed for the FIG. 5 data. It is found that the larger glass probe thermistor element and the FIG. 6 curves provide better illustration of the self-heated thermistor element flow measuring system characteristics than does the smaller bead structure.

In FIG. 6 the vertical scale at the left of the drawing is calibrated in volts and represents voltage appearing across the probe mounted thermistor element under the fluid flow and temperature conditions indicated. The horizontal scale in FIG. 6 is calibrated in units of mass flow rate from zero to 100 percent of maximum flow. The lowermost of the FIG. 6 curves, the curve 602 represents air flowing at a temperature of one hundred ninety four degrees Fahrenheit while the remaining curves 604 and 606 represent air temperatures of seventy 5° and 3° Fahrenheit respectively. Other curves representing intermediate or extreme temperatures outside the range of those shown in FIG. 6 could be plotted but are omitted for clarity.

Several features of the FIG. 6 curves are of interest with regard to a temperature compensated flow measuring system; the first of these features concerns the difference in slope observed between the high and low temperature curves 602 and 606. When the fluid whose flow is being measured is at a temperature of 194° as illustrated by the curve 602 it is apparent from the curve 602 that a change from zero to 100 percent maximum flow produces a change of only 0.4 volts across the thermistor element (from about 1.6 to about 2.0 volts) while at the low 3° fluid temperature the same change from zero to 100 percent flow corresponds to a thermistor voltage change of over 6 volts. Clearly if these two thermistor voltage changes are to produce the same indication of flow rate change on some instrument or provide the same output signal to some flow signal utilizing apparatus compensation for this change of sensitivity with fluid temperature change is required.

A second feature of the FIG. 6 curves which is of interest concerns a tendency of the curves to crowd together as the fluid temperature increases. For the FIG. 6 curves for instance it can be shown that at the 100 percent flow point a 10° change in fluid temperature corresponds to a thermistor voltage change in the order of 1½ volts for a 3° fluid temperature but only six tenths of a volt at the higher 194° fluid temperature. This crowding of the FIG. 6 curves as the fluid temperature increases is indicative of the curves approaching a limit value and indicates that the thermistor will be insensitive to flow below this limit value. In essence the presence of a limit value and the fact that it occurs above zero thermistor voltage indicates the FIG. 6 curves are displaced from the zero volt reference point by some offset voltage.

As is illustrated by the vertical location of the point 610, the origin of the FIG. 6 curves is also displaced from zero thermistor voltage by a constant or offset voltage as was indicated for the limit value of the FIG. 6 curves; such a constant or offset voltage is predicted by the equations which describe self-heated thermistor flow element characteristics earlier in this description. Extrapolation of the FIG. 6 curves to locate the point 610 as is indicated by the dotted lines at 614 could be employed as a method for computing the magnitude of the offset voltage, just as could the value of the thermistor voltage when the thermistor temperature and the fluid temperature first have the same magnitude as suggested in the previous paragraph; however another method for accomplishing this computation is available in the relationship of the slopes of the FIG. 5 or FIG. 6 curves as is explained subsequently.

In prior art flow measuring equipment, many of the calibration adjustments are inter-related so that changing the setting of one adjustment control necessitates a compensatory change in one of the other controls. Calibration of such an instrument necessarily involves long complex procedures having a plurality of repeated steps. Much of the difficulty with prior art flow measuring apparatus including this need for a great number of adjustments and the lack of ability to operate over a satisfactorily wide range of fluid temperatures can be attributed to the prior art flow measuring apparatus failing to satisfactorily separate the flow responsive signal components of the curves in FIG. 5 and FIG. 6 from the offset or non-flow responsive components present in these curves. The flow measuring apparatus shown in FIGS. 1 through 4 and 7 through 8 of the drawings overcomes difficulties found in the prior art flow measuring equipment by separating the flow responsive and non-flow responsive components of the curves before the sensitivity temperature compensating function is performed. These apparatuses then employ a selected electrical network which involves one or a plurality of temperature responsive thermistor elements located in close proximity with but separated from the flow responsive thermistor element to provide compensation for the decreasing sensitivity of the thermistor element at elevated temperatures. After performance of these operations, the flow measuring apparatus of FIG. 1 through 4 and 7 through 8 have been found capable of providing a measuring accuracy that is well within 2 percent of the indicated reading over a temperature range exceeding 150° Fahrenheit and with an even larger range of operation being likely.

Equation (8) can be employed to compute an initial value for either the term $C'$ or the gain $G_S$ by substituting therein values obtained from the experimental data of table 1 below. If equation (8) is re-arranged in a manner suitable for computing the term $C'$ it assumes a form as follows:

$$C' = \frac{V_{TRN} V_{TS1} - V_{TR1} V_{TSN}}{V_{TS1} + V_{TRN} - V_{TR1} - V_{TSN}} \quad (9)$$

where $V_{TR1}$ represents thermistor voltage at a first temperature and a first flow rate and $V_{TS1}$ represents the voltage at the same first flow rate but at some second temperature and $V_{TRN}$ represents the voltage at the same first temperature but at some second flow rate and $V_{TSN}$ represents the voltage at the second flow rate and the second temperature.

If equation (8) is re-arranged in a form suitable for computing the gain $G_S$ by solving for $C'$ on two sides of the equal sign and equating the two resulting expressions involving $G_S$, there results:

$$G_S = \frac{V_{TR1} - V_{TRN}}{V_{TS1} - V_{TSN}} \quad (10)$$

Equations (9) and (10) allow either the term $C'$ or the gain $G_S$ to be computed from experimental data. As an example of using these equations, the four voltage values which are underlined on Table 1 below can be used as values for the terms in these expressions. Using these four values and solving the resulting equation in $C'$ provides a value of $C'$ which is 1.05. Selecting a different four voltage values from Table 1 may provide a slightly different value for $C'$ however any such value will generally be adequate for first trial as a $C'$ offset signal in the FIG. 1 apparatus. In the case of a flow meter intended for use with air and over a temperature range up to 180° Fahrenheit with the data of Table 1, the initially computed value of 1.05 for $C'$ is found to provide a correcting signal of sufficient accuracy without further modification.

TABLE 1

| | Air Temperature °F | | | | | | |
|---|---|---|---|---|---|---|---|
| Flow No./Hr. | 77 | 92 | 117 | 136 | 153 | 166 | 172 |
| 0 | 1.79 | 1.71 | 1.57 | 1.47 | 1.38 | 1.32 | 1.30 |
| 112 | 3.64 | 3.44 | 3.08 | 2.83 | 2.60 | 2.45 | 2.37 |
| 219 | 4.17 | 3.93 | 3.50 | 3.19 | 2.92 | 2.73 | 2.64 |
| 457 | 4.77 | 4.48 | 3.97 | 3.61 | 3.28 | 3.07 | 2.96 |
| 651 | 5.15 | 4.83 | 4.27 | 3.86 | 3.50 | 3.26 | 3.14 |
| 880 | 5.43 | 5.09 | 4.49 | 4.05 | 3.68 | 3.40 | 3.28 |
| 1000 | 5.56 | 5.21 | 4.59 | 4.14 | 3.74 | 3.48 | 3.35 |

If the voltage values in the above table 1 are divided by the corresponding flow rate, the quotient is the instantaneous slope of the voltage versus fluid temperature and flow rate curve (ie. FIG. 5 in the drawings). If these instantaneous values of curve slope are corrected by subtracting from each slope voltage value the proper correcting voltage, ie. the value of C', then it is found that the instantaneous slope values have such regularity that the ratio of the first and second corrected curve slopes at a first temperature and at first and second flow rates is equal to the ratio of the third and fourth corrected slopes at a second temperature at the same first and second flow rates. This procedure may be used as an alternate method for evaluating the constant C' and if used with the underlined values of voltage in table 5 provides the previously computed 1.05 volt value for C'.

Although there is need for subtracting a precisely determined value of C' such as the 1.05 volt value computed above from the thermistor flow signal data when a flow measuring system capable of operating over a wide range of temperatures and a wide range of fluid velocities is desired, it is possible to achieve satisfactory measurement performance in a measuring system which is less demanding in terms of accuracy, temperature range and fluid velocity range by omitting the subtraction of a C' offset signal in the signal processing. Since many applications of fluid flow measurement equipment including that of automotive fuel to air ratio measurement do involve large ranges of temperature and flow and high accuracy requirements, this omission of the C' subtraction subraction is considered to be an alternate use of apparatus made in accordance with the present invention.

In FIG. 1 the electronic circuitry for subtracting the 1.05 volt C' signal evaluated above from the $V_T$ signal developed across thermistor 107 is comprised of the operational amplifier 110, battery 113, variable resistor 115 and fixed resistors 114 and 119; these elements are connected to the positive input terminal of the operational amplifier 110. The magnitude of the C' signal is selected by adjusting the variable resistor 115. The voltage gain of the operational amplifier 110 is determined essentially by the ratio the resistance elements 116 and 111. The resistance element 114 may be made equal in value to the element 111. The output signal from operational amplifier 110 represents the difference between the $V_T$ and C' signals; this difference signal is identified as $\Delta V_T$ in FIG. 1.

TABLE 2

| | 1.05 Volts Subtracted From Table 1 Values | | | | | | |
|---|---|---|---|---|---|---|---|
| Flow No./Hr. | 77 | 92 | 117 | 136 | 153 | 166 | 172 |
| 0 | .74 | .66 | .52 | .42 | .33 | .27 | .25 |
| 112 | 2.59 | 2.39 | 2.03 | 1.78 | 1.55 | 1.40 | 1.32 |
| 219 | 3.12 | 2.88 | 2.45 | 2.14 | 1.87 | 1.68 | 1.59 |
| 452 | 3.72 | 3.43 | 2.92 | 2.56 | 2.23 | 2.02 | 1.91 |
| 651 | 4.10 | 3.78 | 3.22 | 2.81 | 2.45 | 2.21 | 2.09 |
| 880 | 4.38 | 4.04 | 3.44 | 3.00 | 2.61 | 2.35 | 2.23 |
| 1000 | 4.51 | 4.16 | 3.54 | 3.09 | 2.69 | 2.43 | 2.30 |

Table 2 shown above is derived from Table 1 by subtracting the computed C' value of 1.05 from each of the numbers in Table 1. Although the data in Table 2 is not plotted in the manner of FIG. 5, the small 0.25 volt value in Table 2 corresponding to zero flow at 172° Fahrenheit indicates that subtraction of the 1.05 volt C' signal generally has the effect of shifting the FIG. 5 family of curves 500 downward on the co-ordinate axis until the zero fluid flow curve nearly reaches the zero volt co-ordinate axis at the high temperature asymptotic end. After this shifting has been accomplished, the remaining portion of the FIG. 5 curves (as represented by the data in Table 2) concerns mass flow phenomenon and can be employed in generating a flow responsive signal in the FIG. 1 apparatus.

If each of the different thermistor voltage values for each temperature and one flow rate in Table 2 is normalized to the voltage for that same flow rate at 77° Fahrenheit, that is, if the voltage representing 77° Fahrenheit temperature is used as the numerator of a fraction and the voltage at each other temperature for the same flow rate is successively used as the denominator of the fraction and the resulting fractions are reduced to a decimal value, the results will be a set of ratio values as shown in Table 3. The Table 3 ratio values indicate for each flow rate, the gain or the multiplying factor which can be employed in predicting the voltage across the thermistor 107 at any given temperature once the flow voltage is known at the normalization temperature (77° F. in this example). In essence the data of Table 3 also represents the sensitivity correction needed in a flow measuring apparatus if this apparatus is to provide flow indications which are independent of fluid temperature.

TABLE 3

|  | Temperature °F | | | | | | |
|---|---|---|---|---|---|---|---|
| Flow No.Hr. | 77 | 92 | 117 | 136 | 153 | 166 | 172 |
| 0 | — | — | — | — | — | — | — |
| 112 | 1.0 | 1.084 | 1.276 | 1.455 | 1.671 | 1.85 | 1.962 |
| 219 | 1.0 | 1.083 | 1.273 | 1.458 | 1.668 | 1.857 | 1.962 |
| 452 | 1.0 | 1.085 | 1.274 | 1.453 | 1.668 | 1.842 | 1.948 |
| 651 | 1.0 | 1.085 | 1.273 | 1.459 | 1.674 | 1.855 | 1.962 |
| 880 | 1.0 | 1.084 | 1.273 | 1.46 | 1.678 | 1.864 | 1.964 |
| 1000 | 1.0 | 1.084 | 1.274 | 1.46 | 1.677 | 1.856 | 1.961 |

As an examination of the data in Table 3 indicates, once an appropriate C' correcting signal is subtracted from the Table 1 voltages and the remaining voltages are normalized, there exists a great deal of regularity in the thermistor flow signal data. For instance, it can be seen from Table 3 that the corrected signal obtained from the thermistor element 107 in FIG. 1 at 92° Fahrenheit is approximately 1.084 times the signal obtained at 77° Fahrenheit regardless of what quantity of fluid is passing the thermistor element 107 and the signal obtained at a temperature of 136° Fahrenheit is approximately 1.46 times as large as the signal obtained at 77° Fahrenheit regardless of what fluid quantity is passing the thermistor element 107. The fact that significant regularity is found in the Table 3 normalized data enables an organized procedure for fabricating a flow measuring system to be employed. This regularity also indicates that the 1.05 volt value selected for the quantity C' in equation (6) is generally close to the idealized or actual magnitude of C' and also indicates that the data in Table 1 was obtained without incorporation of large experimental error.

Converse to the correctness of the 1.05 volt value, the amount of variation in the Table 3 ratios as different fluid flow rates are considered can be employed as a measure of correctness for the selected C' magnitude; if the first computed value of C' results in a relatively large spread of single temperature values in the Table 3 data, slightly altered successive values for C' can be subtracted from the Table 1 data until a satisfactorily small spread in the Table 3 data is obtained.

In view of the regularity of the data shown in Table 3, if an amplifier having signal gain which is fluid temperature responsive in accordance with the ratios shown in Table 3 is coupled to a source of offset corrected thermistor flow signal voltages such as the voltage $\Delta V_T$ in FIG. 1, the output of this amplifier will represent mass fluid flow rate and will be independent of fluid temperature, that is, the output of the amplifier will vary only in response to the quantity of fluid flowing and will be substantially independent of the temperature of the fluid.

The operational amplifier 120 in FIG. 1 is provided with the temperature responsive gain suggested by the data in Table 3. In tailoring the gain of this amplifier, consideration must be given to the fact that the ratios shown for each temperature in Table 3 vary slightly due primarily to experimental error and also possibly because of an imperfect selection of value for the constant C' in equation (6). In view of this slight variation, some number which is mathematically fairly representative of all the Table 3 values at each temperature is needed for selecting an appropriate amplifier gain. In Table 4 there is shown on the first line a group of numbers which are obtained by mathematically averaging the ratios shown at each temperature in Table 3.

TABLE 4

|  | Air Temperature °F | | | | | | |
|---|---|---|---|---|---|---|---|
|  | 77 | 92 | 117 | 136 | 153 | 166 | 172 |
| Average Gain | 1.0 | 1.084 | 1.274 | 1.458 | 1.673 | 1.854 | 1.96 |
| Reciprocal of Average Gain | 1.0 | .923 | .785 | .687 | .598 | .539 | .51 |

In order that negative temperature coefficient thermistors having smaller electrical resistance at high temperature than at low temperature may be employed in the temperature responsive gain network for operational amplifier 120, it is desirable for this gain network to appear in the input circuit of amplifier 120 rather than in the feedback circuit. When the temperature compensating gain network 118 is located in the input circuit of operation amplifier 120, its resistance value appears in the denominator of the mathematical gain expression for the amplifier and hence the reciprocal of the values shown in the first line of Table 4 and as shown in the second line of Table 4 are required. Alternately if the temperature compensating network were embodied using positive temperature coefficient heat sensing elements, the gain control network could be located in the position of feedback resistor 122 in FIG. 1. Even though the reciprocal values of the average gains from Table 4 are used in mechanizing the amplifier 120, the actual gain of the amplifier 120 will itself be in accordance with the average gain values shown in the first line of Table 4; these average gain values are plotted in the curve 520 shown in FIG. 5 using the scale shown at 506.

The temperature compensating gain network 118 in FIG. 1 may incorporate one or more thermally responsive elements located in contact with the moving fluid. The curve fitting process wherein the temperature response of the selected electrical network is conformed to the sensitivity variation of the thermally responsive element 107 may be accomplished by trial and error or by using one of several empirical curve fitting algorithims which are known in the art. For most applications of the flow measuring apparatus, an electrical network which includes two additional thermally responsive elements as shown in FIG. 2 and FIG. 3 of the drawings is suitable for compensating the sensitivity variation of a thermistor type of thermally responsive element at 107 in FIG. 1; however, an electrical network which includes three or four or a plurality of thermally responsive elements may be desirable in high precision flow measuring equipment.

The electrical networks shown in FIG. 2 and 3 of the drawings have been found capable of generating temperature response curves suitable for temperature compensation in a flow measuring system if the value of fixed resistance elements 208 and 210 in FIG. 2 and 308 and 310 in FIG. 3 and the temperature responsive elements 204 and 206 in FIG. 2 and 304 and 306 in FIG. 3 are correctly selected. The temperature compensating network of FIG. 2 is useful with mass flow measuring apparatus intended for use with air over a temperature range of generally 150° Fahrenheit when the thermistor element 204 has a 50 kilo-ohm nominal resistance at 25° Centigrade and the thermistor element 206 has a 10 kilo-ohm nominal resistance at 25° Centigrade and the resistance 208 is embodied as a 17.4 kilo-ohm fixed resistance and the resistance 210 is embodied as a 12.5 kilo-ohm fixed resistance. In other flow meter apparatus for different fluids and different temperature ranges, the compensating network shown in FIG. 3 has been found desirable. The FIG. 3 network resembles that of FIG. 2 except the fixed resistance element 310 shunts only the thermistor element 306 in FIG. 3 while in FIG. 2 the fixed resistance element 210 shunts the series combination of thermistor element 206 and fixed resistance element 208. In the FIG. 2 and 3 networks, the thermistor elements 204, 206, 304 and 306 are intended for operation in the non self-heated mode, that is, with low power dissipations which produce negligible self heating. For yet other flow measuring systems which are intended for use over a limited range of temperatures or with lower overall measurement accuracy, it is found that a simple temperature compensating network which contains only a signle temperature responsive thermistor element connected in parallel with a single fixed resistance element can be employed. This simple form of temperature compensating network is not expressly shown in the drawings but consists of a network such as that shown in FIG. 3 with the elements 306 and 310 omitted so that the elements 308 and 304 are connected in parallel. The common feature of all compensating networks is that they are essentially constant current networks for any given flow rate. That is, for any given flow rate over the temperature range of interest, the network should provide a constant current when impressed with a voltage proportional to that appearing across the flow bead as corrected.

As indicated by the absence of numbers in the first line of Table 3, the voltages corresponding to a net flow of zero are omitted in deriving the average gain figures shown in Table 4. As is well known in the flow measuring art, once the net flow of fluid (as indicated by the arrows 102 in FIG. 1) becomes very small, several complex factors must be considered if significance is to be attached to thermistor voltage signals. In the absence of need for flow measurements in the very low net flow area of operation, it is desirable to suppress a portion of the scale of the indicating instrument (shown as 136 in FIG. 1) or the equipment utilizing the flow signals and to commence calibration of such devices with a finite quantity of flow above zero value. In terms of the electrical circuitry within a flow measuring apparatus such as that shown in FIG. 1 the suppression of zero scale value can be accomplished by subtracting from the flow signal a small constant voltage which is selected to correspond generally with the average voltage measured across thermistor element 107 during conditions of zero flow. In the circuit of FIG. 1 this subtraction is accomplished by the operational amplifier 128 together with the adjustable resistor 124 which is connected to a stable source of voltage at terminal 126 and which is provided with a polarity such that subtraction will occur in the operational amplifier 128. The importance of this zero suppressing subtraction is minimized by the effect of function generator circuit 134 since the function generator circuit tends to enhance large signals and to diminish smaller signals obtained from the operational amplifier 128.

The output signal from operational amplifier 128 is an electrical signal which represents the quantity of fluid flowing past the thermistor element 107; this signal could be applied directly to a utilizing means such as a volt-meter or milliameter, however if such direct application is employed, a special scale calibration compressed more at one end than at the other will be required since the voltage from operational amplifier 128 does not bear a linear relationship to fluid velocity as shown in FIG. 6. If it is desired to apply signal from the operational amplifier 128 to an instrument having a linear scale calibration such as the calibration normally found in a digital volt-meter, the function generator circuit represented at 134 and mentioned above may be used. Function generator circuits which employ a series of resistor and diode or other non-linear elements in a voltage responsive electrical network are known in the flow measuring and general electronic art and may be employed to embody the block 134 in FIG. 1 for modifying the output signal from operational amplifier 128 into a linear voltage versus fluid-flow relationship.

In FIG. 4 of the drawings there is shown an alternate embodiment of a flow measuring apparatus made according to the present invention. The apparatus of FIG. 4 includes a flow conducting member 400 for transmitting a flow of fluid indicated by the arrows 402. The flow conducting member 400 is shown cutaway at 401 in order that the flow responsive elements be visible. The apparatus of FIG. 4 includes two sources of constant current 408 and 414 which are connected to excite the two thermistor elements 407 and 417 that are located in the fluid conducting member 400. The thermistor element 417 in FIG. 4 is mounted in a shielded cavity 419 at the tip of a probe member 405 and this probe member is separated from the probe member 404 used to mount the thermistor elements 407 and 416. In the apparatus of FIG. 4 a sensitivity temperature compensating network 418 is connected by a set of leads 410 to two temperature responsive thermistor elements 416 which are mounted in close proximity to the primary sensing thermistor element 407. An indicating instrument 412 is connected in series with the sensitivity temperature compensating network 418 and this series combination is connected across the two thermistor elements 407 and 417.

In the apparatus of FIG. 4 both the thermistor elements 407 and 417 are excited in the self-heated mode of operation however only the thermistor element 407 is exposed to the actual fluid flow in the conducting member 400; the thermistor element 417 is exposed to the fluid temperature but is shielded from the flow of this fluid by the cavity-like structure 419.

In the flow measuring apparatus shown in FIG. 4 the reference thermistor element 417 serves to balance out or remove from the signal impressed on the indicating instrument 412 the non-flow dependent components of the voltage developed across the flow responsive thermistor element 407. The reference thermistor element 417 also serves to remove from the indicating instrument components of the signal from flow responsive thermistor element 407 which are generated solely by a change of fluid temperature.

As is true for the apparatus of FIG. 1, when fluid flows in the conducting member 400 in FIG. 4 the sensitivity of thermistor element 407 varies in accordance with the temperature of fluid passing over its surface. The temperature responsive electrical network 418 in FIG. 4 varies the sensitivity of the FIG. 4 apparatus in response to the temperature of the fluid in conduit 400 and thereby offsets the change in thermistor sensitivity which accompanies increasing fluid temperature. The two thermistor elements 416 which cause the resistance of the temperature compensating network 418 in FIG. 4 to vary according to the fluid temperature are operated in the non-self heated mode and are located in close proximity with flow responsive thermistor element 407. In FIG. 4 these two thermistor elements connected into the network 418 are mounted in the probe structure 404 with the flow responsive thermistor element 407 but are mounted at a different elevation with respect to the flow responsive thermistor element 407 in order that they not alter the fluid stream around the flow responsive thermistor element 407.

The sensitivity temperature compensating network 418 in FIG. 4 can be fabricated according to the circuit diagrams shown in FIG. 2 or in FIG. 3 with the actual values of the components in these networks being in accordance with the sensitivity of the indicating instrument 412 and other parameters of the circuit.

In some applications of the circuit shown in FIG. 4 it may be desirable to incorporate adjustment potentiometers in series with the thermistor element 417 and in series with the temperature compensating network 418 in order that precise adjustments of the balance between thermistor element 417 and thermistor element 407 and vernier adjustments of the sensitivity of the instrument be possible.

Figure 7:
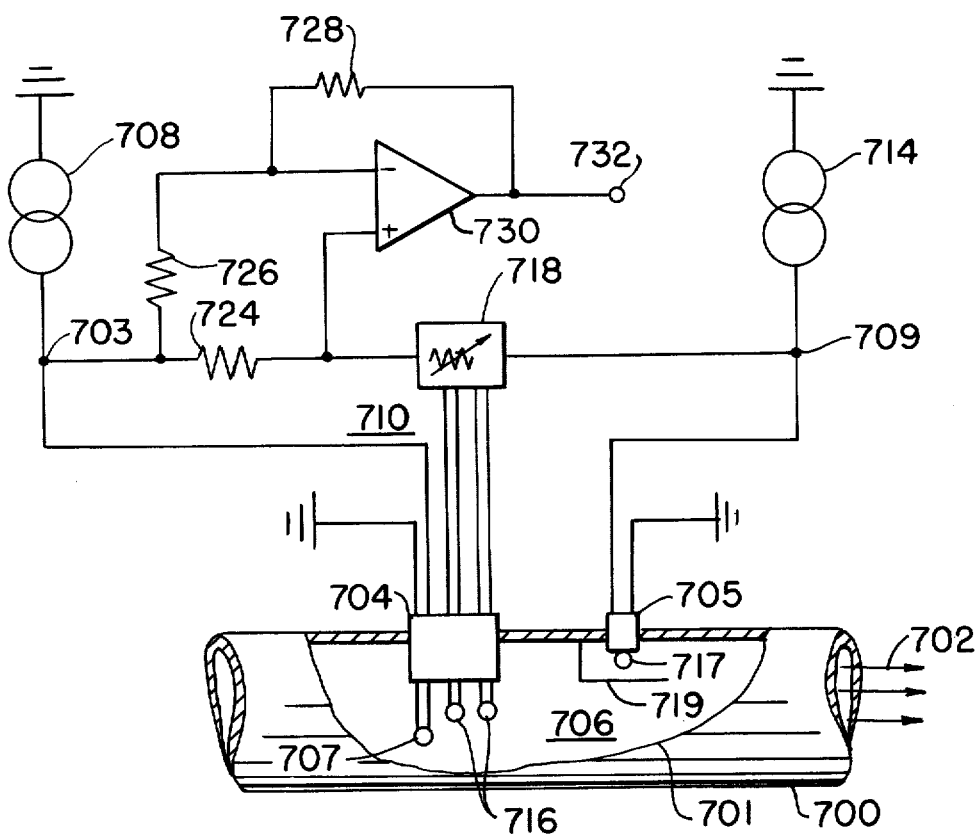
FIG. 7 of the drawings shows another alternate embodiment of a flow measuring apparatus made according to the present invention.

Another embodiment of a flow measuring apparatus made in accordance with the present invention and incorporating some elements of the FIG. 4 apparatus and some elements of the FIG. 1 apparatus is shown in FIG. 7 of the drawings. In the FIG. 7 apparatus many of the circuit elements correspond in purpose and function with the similar elements shown in FIG. 4 of the drawings; these corresponding circuit elements are numbered with corresponding numbers in the 400 series in FIG. 4 and in the 700 series in FIG. 7.

The FIG. 7 apparatus includes a fluid conducting member 700 which is shown cut away at 701 and which contains a probe 704 that is used to mount the thermistor elements 707 and 716. Each of these elements and elements indicated by numbers between 700 and 719 in FIG. 7 are similar to the corresponding elements 400 to 419 in FIG. 4 in both structure and function.

At 724 in FIG. 7 there is shown an electrical resistance element which together with amplifier 730 is employed in lieu of the indicating instrument 412 to couple a flow indicative signal from the flow conducting apparatus.

In the FIG. 7 apparatus the resistance element 724 is selected to provide a desired current flow through the temperature responsive network 718 and a flow signal voltage that is suitable for amplification by the amplifier 730. The amplifier 730 is a difference amplifier which responds only to the voltage developed across resistance element 724; this amplifier may be an operational amplifier as shown in FIG. 7. The resistance elements 726 and 728 in FIG. 7 are determinative of the operational amplifier voltage gain in the manner known in the art. The output signal from the FIG. 7 flow measuring apppear at terminal 732.

Incorporation of amplifier 730 in the FIG. 7 apparatus provides improved measuring sensitivity and allows the temperature responsive network to be better suited to the flow measuring equipment since these properties of the system are no longer limited by an indicating instrument that requires a certain predetermined current flow magnitude in the temperature responsive network 718.

Figure 8:
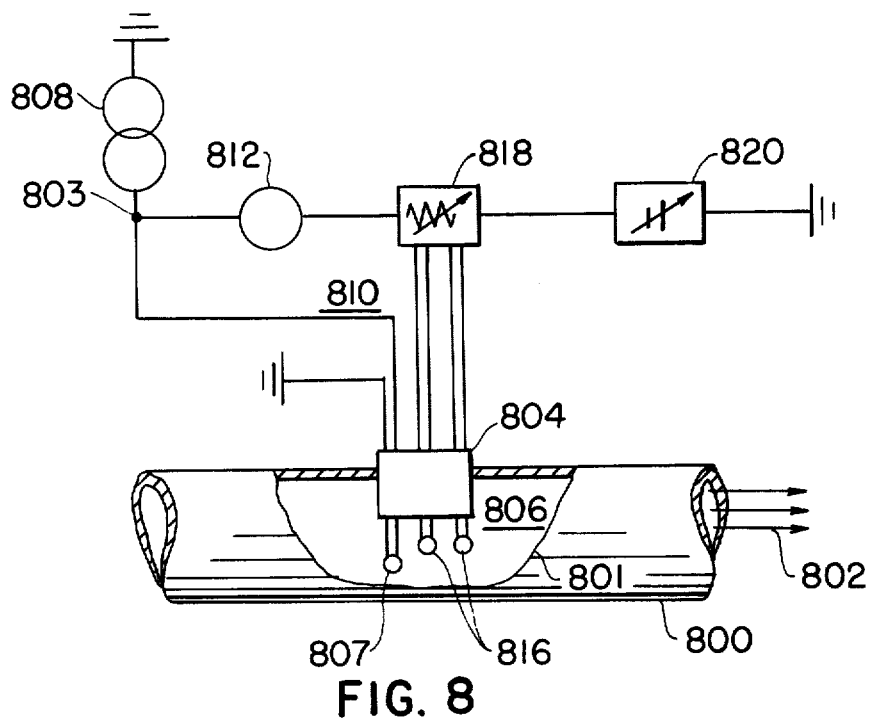
FIG. 8 of the drawings shows yet another alternate embodiment of a flow measuring apparatus made according to the present invention.

In FIG. 8 of the drawings there is shown yet another modification of the FIG. 4 embodiment of the present invention. In FIG. 8 as was true in the FIG. 7 circuitry, the elements with identification numbers between 800 and 818 correspond to the numbers in the 400 series in FIG. 4 in both structure and function.

At 820 in FIG. 8 there is shown an adjustable source of voltage signal which is used in lieu of the compensating thermistor element 417 and its current source 414 in FIG. 4. It is intended that the source 820 in FIG. 8 be some stable and adjustable source of voltage and that the magnitude of the voltage obtained from this source remain fixed after the apparatus is initially set up and calibrated.

Since both the FIG. 1 and the FIG. 8 embodiments of the flow measuring apparatus involve the subtraction of a constant voltage signal from the voltage generated by the flow responsive thermistor element, the characteristics of the FIG. 1 and FIG. 8 systems are similar. However, since the FIG. 1 system performs the constant voltage subtraction operation in an operational amplifier circuit, it offers greater freedom in selecting the correlation between fluid flow rate and the flow responsive thermistor element voltage than does the FIG. 8 system where the subtraction is performed in an abbreviated bridge circuit and this circuit must also accommodate the characteristics of the indicator device 812. The indicator device 812 in FIG. 8 is also determinative of the current flow and the power dissipation imposed on the temperature responsive resistance network 818. The indicator device 812 may, of course, be replaced with an amplified indicator circuit as shown 730 in FIG. 7 if desired.

Although the systems and apparatus hereof have been described in terms of fluid flow measuring equipment wherein a thermally responsive element and one or more additional compensating thermally responsive elements are located within a small fluid transmitting cavity, these systems and apparatus are equally pertinent to the art of fluid velocity measurement wherein the main thermally responsive element and the compensating thermally responsive elements are all located on a probe member which can be inserted into a moving fluid stream at several selected locations. For fluid velocity measuring equipment the indicating instrument 136 in FIG. 1 is calibrated according to a velocity rather than a mass or volume scale and the gain of the electrical circuitry located between the thermally responsive elements and the indicating instrument 136 is appropriately selected.

While the system and apparatus hereof accomplishes the objects and advantages mentioned, certain variations may of course occur to those skilled in the art and it is contemplated that all such variations not departing from the spirit and scope of the invention hereof are to be construed in accordance with the following claims.

What is claimed is:

1. A method for processing the electrical signal generated by a self-heated flow responsive thermal element in a fluid flow measuring apparatus to obtain therefrom a flow indicative output signal that is substantially invarient with respect to fluid temperature, said method comprising the steps of:

exciting a fluid immersed thermal element with a signal generating constant current that is independent of fluid temperature and flow rate and selected to operate the element at a temperature above the fluid temperature;

subtracting from said thermal element signal a constant offset signal that is greater than zero and smaller than the smallest magnitude of said thermal element signal during any condition to be measured and wherein said offset signal has the same value for all flow rates and temperatures of the fluid being measured and selected in accordance with the properties of the measuring apparatus and the flowing fluid, thereby forming a corrected signal;

selecting a predetermined different fractional part of said corrected signal for use as said flow indicative output signal at each fluid temperature;

whereby removing said constant offset signal prior to selecting a fractional part of the corrected thermal element signal for use as an output signal allows said output signal to be selected from said corrected signal independently of flow rate.

2. The method of claim 1 wherein said constant signal is the largest constant value signal that can be subtracted from said thermal element signal without allowing said corrected signal to become negative in polarity at any fluid temperature and flow rate to be measured by said apparatus.

3. The method of claim 1 wherein said constant signal subtracted from said thermal element signal has an amplitude substantially equal to said thermal element signal when said element is subjected to the lowest operating temperature at which the temperature difference between said fluid and said thermal element is substantially zero.

4. The method of claim 1 wherein said constant signal subtracted from said thermal element signal is selected in magnitude to produce the minimum variation in the ratio of said first component signal at any constant flow rate and any two selected fluid temperatures as the rate of fluid flow past said thermal element is altered.

5. The method of claim 1 wherein the fraction of said selected fractional part has a value less than unity at some low first fluid temperature, a value of unity at some second fluid temperature higher than said first fluid temperature and a value greater than unity at some third fluid temperature higher than said second fluid temperature.

6. The method of claim 1 wherein said constant signal subtracted from said thermal element signal is selected to have a magnitude substantially equalling the magnitude of said thermal element signal under the conditions of zero net fluid flow and the highest fluid temperature to be measured by said fluid flow measuring apparatus.

7. A method for fitting the gain of a utilizing electrical apparatus to the characteristics of a thermal flow responsive element to achieve flow measurements which are independent of fluid temperature, said method comprising the steps of:

measuring the voltage drop across a thermal flow responsive element at periodic fluid flow rate intervals and periodic fluid temperature intervals in the range to be measured by said flow responsive element while said element is mounted in a fluid stream and excited into the constant current self-heated operating mode, whereby a first periodic table of voltages corresponding to different fluid temperatures and different fluid flow rates is obtained;

forming a first component by substracting from each of said voltages in said first periodic table a second component smaller than said first component at each fluid flow rate and each fluid temperature and constant for all values in said first periodic table, forming from said first component of voltage a second periodic table of voltages;

normalizing the voltages for each flow rate in said second periodic table to the voltage at one selected temperature for that same flow rate, said normalizing including, for each flow rate, dividing the voltage corresponding to said selected temperature by the voltage corresponding to each other temperature, the results of said normalizing step forming a third periodic table of normalized voltage ratios, selecting from the voltage ratios corresponding to each temperature in said third periodic table a voltage ratio mathematically representative of all the ratios at that temperature, preforming said selecting step for each periodic temperature in said third periodic table whereby a family of voltage ratios is formed with each member of said family representing the gain needed at one fluid temperature in a fluid mass flow apparatus having uniform sensitivity over a large range of fluid temperatures;

adjusting the gain vs. temperature response of a fluid temperature responsive variable gain electrical apparatus that is connected with said thermal flow responsive element to said family of voltage ratios;

whereby removing said second component of voltage from the voltages in said first periodic table decreases the variation in said third periodic table voltages at each temperature.

8. The method of claim 7 wherein said second component of said first periodic table voltages is the largest voltage which can be subtracted from said first periodic table voltages without reducing said first component voltage to zero at any temperature and flow rate.

9. The method of claim 7 wherein said second component of said first periodic table voltages has a magnitude smaller than said thermal flow element voltage in said first periodic table under the combined conditions of zero net fluid flow and the highest fluid temperature to be measured by said thermal flow element.

10. The method of claim 7 wherein said second component of said first periodic table voltages is subtracted from said first periodic table voltages to form said second periodic table of voltages and wherein said second component has an amplitude which minimizes the variation spread in single fluid temperature normalized voltage ratios in said third periodic table of voltage ratios as the fluid flow rate changes.

11. The method of claim 7 wherein said step of selecting from the voltage ratios corresponding to each temperature in said third periodic table a voltage ratio fairly representative of all the ratios at that fluid temperature, includes the step of mathematically averaging the voltage ratios corresponding to each fluid temperature in said third periodic table.

12. Measuring apparatus comprising:
a first fluid flow responsive negative temperature coefficient thermistor element mounted centrally in a fluid conducting member;
current generating means connected with said thermistor element for supplying thereto an electrical exciting current having a constant magnitude independent of the fluid flow and temperature and the resistance of said thermistor element and of sufficient amplitude to operate said thermistor element in the self-heated region of its E-I characteristic curve and for thereby generating across said thermistor element a thermistor voltage signal;
circuit means connected with said thermistor element and responsive to said thermistor voltage signal and including a source of constant subtracting offset corrective signal smaller than the smallest magnitude of said thermistor voltage signal during any condition to be measured and wherein said offset signal has the same value for all temperatures and flow rates thereby removing a portion of said thermistor signal and flow signal;
signal gain controlling means connected with said circuit means and including a temperature responsive element mounted in said fluid conducting member for generating from said first corrected flow signal an amplitude corrected second flow signal;
signal utilization means connected with said signal gain controlling means for utilizing said second flow signal;
whereby removal of said constant subtracting offset corrective signal from said thermistor signal enables operation of said signal gain controlling means in response to fluid temperature without correction for flow rate.

13. The measuring apparatus of claim 12 wherein said apparatus also includes function generator means connected between said signal gain controlling means and said signal utilization means for generating from said second corrected flow signal a third flow signal having a non-linear relationship with said second corrected flow signal.

14. The measuring apparatus of claim 12 wherein said source of corrective signal in said circuit means has the largest amplitude possible without reducing said first corrected flow signal to zero at any fluid temperature and flow rate to be measured by said apparatus.

15. The measuring apparatus of claim 12 wherein said apparatus also includes signal subtracting means following said signal gain controlling means for subtracting from said second flow signal a small signal of selected constant amplitude for suppressing the zero flow response of said apparatus in said signal utilization means.

16. The measuring apparatus of claim 12 wherein said current generating means supplies a current in the range of 3 to 20 milliamperes to said thermistor element.

17. The measuring apparatus of claim 12 wherein said signal gain controlling means includes operational amplifier circuit means and wherein said temperature responsive element is a negative temperature coefficient thermistor element included in a gain controlling circuit location in second operational amplifier circuit means.

18. A method for computing the magnitude of an offset signal to be subtracted from the output signal of a self-heated, constant current excited, thermal element immersed in a flowing fluid in processing said output signal to represent fluid flow rate independently of fluid temperature, said method comprising the steps of:
measuring a first voltage across said self-heated fluid immersed thermal element while said element is subjected to a first fluid temperature and a first fluid flow rate;
measuring a second voltage across said self-heated fluid immersed thermal element while said element is subjected to a second higher fluid temperature and said same first fluid flow rate;
measuring a third voltage across said self-heated fluid immersed thermal element while said element is subjected to said first fluid temperature and a second higher fluid flow rate;
measuring a fourth voltage across said self-heated fluid immersed thermal element while said element is subjected to said second fluid temperature and said second fluid flow rate;
subtracting from said first, second, third and fourth voltages a single offset signal voltage having such magnitude that upon subtraction of said offset signal voltage the ratio of the remaining first voltage to the remaining second voltage equals the ratio of the remaining third voltage to the remaining fourth voltage.

19. A method for computing the magnitude of an offset signal to be subtracted from the output signal of a thermal element which is surrounded by a flowing fluid, during the processing of said output signal to represent fluid flow rate independently of fluid temperature, said method comprising the steps of:
measuring the output signal voltage across said thermal element at periodic temperature intervals and periodic flow rate intervals in the range to be measured by said thermal element and while said thermal element is mounted in a fluid stream and electrically excited by a constant current;
organizing said periodic values of output signal voltage into a form characteristic of a family of curves each member of which represents variation in said output signal voltage with respect to fluid temperature and fluid velocity;
equating the ratio fraction of a first and second curve slopes taken at a single first temperature and at first and second flow rates in said family of curves to the ratio fraction of a third and fourth curve slopes taken at a second temperature and at said same first and second flow rates in said family of curves, said step of equating including the act of diminishing the voltage factor in each of said first, second, third and fourth curve slopes by the value of said offset signal, with said offset signal being determined as a value which enables the equating of said ratio fractions.

20. A method for fitting the gain of a flow indicating apparatus to the characteristics of a thermal flow responsive element to achieve flow measurements which are independent of fluid temperature, said method comprising the steps of:

measuring the voltage drop across said thermal flow responsive element at periodic fluid flow rate increments and periodic fluid temperature increments in the range to be measured by said flow responsive element while said element is mounted in a fluid stream and excited in the constant current self-heated mode, whereby a first periodic table of voltages corresponding to different fluid temperatures and different fluid flow rates is obtained;

dividing the difference between said thermal flow responsive element voltage at a first high flow rate and a second lesser flow rate both taken at a first low reference temperature by the difference between said thermal flow-responsive element voltage at said same high flow rate and said same second lesser flow rate both taken at the next temperature adjacent said reference temperature and at successive temperatures in said periodic table, said dividing steps providing a gain value relating flow responsive element voltages at each temperature in said periodic table to flow responsive element voltage at said reference temperature;

multiplying the thermal flow responsive element voltage obtained during measurement of an unknown fluid flow rate by a value taken from said gain values and values interpolated from said gain values in accordance with the temperature of said unknown fluid.

21. The method of claim 20 including the step of extracting from said thermal flow responsive element signal an offset signal that is independent of fluid flow rate and fluid temperature.

22. An improved method for processing the electrical signal obtained from a self-heated constant current excited thermistor element in a flow measuring system, wherein the improvement comprises:

removing from said thermistor signal prior to additional processing and use of said signal an offset signal which has a magnitude greater than zero and constant for all fluid flow and temperature conditions to be measured and smaller than the smallest magnitude of said thermistor signal during any condition of flow to be measured;

whereby temperature compensating gain correction may be applied to the remaining offset corrected thermistor signal without regard for flow rate.

23. The method of claim 22 wherein said offset signal has a magnitude corresponding with the signal that said thermistor element would develop at the extended intersecting point of a family of curves relating thermistor signal fluid temperature and flow rate.

24. The method of claim 22 wherein said offset signal has a magnitude corresponding to the point of common intersection in a family of curves relating flow rate and thermistor signal.

25. Flow measuring apparatus comprising:

a negative temperature coefficient thermistor element immersed in a fluid conducting member;

current generating means connected with said thermistor element for operating said element in the constant current self-heated mode, and generating across said element a thermistor signal which includes a constant component and a component responsive to the flow rate and the temperature of said fluid;

signal compensating means connected with said thermistor element signal and including a source of smaller constant signal for subtracting from said thermistor element signal a signal selected to offset said constant component signal and having a value smaller than the smallest magnitude of said thermestor signal during any condition to be measured and wherein said offset signal has the same value for all flow rates and temperatures;

variable gain means connected with said signal compensating means and including temperature responsive means mounted in said fluid for adjusting independently of flow rate variation the amplitude of signal received from said compensating means in response to the temperature of said fluid; and signal utilizing means connected with said variable gain means for utilizing the compensated gain adjusted thermistor signal.

26. The apparatus of claim 25 wherein said signal subtracted from said thermistor signal has a magnitude corresponding with the signal that said thermistor element would develop at the theoretical intersecting point of a family of curves relating thermistor signal, flow rate, and temperature.

27. The apparatus of claim 25 wherein said variable gain means includes a temperature responsive two-terminal network, said network comprising:

a first electrically conductive thermally responsive member located in said fluid and connected between the first and second terminals of said network;

a second electrically conductive thermally responsive member located in said fluid and having one terminal thereof connected with said first network terminal;

a first fixed resistance element connected between the second terminal of said second thermally responsive member and said second network terminal;

resistance means connected with said first network terminal and providing a path between said first and second network terminals.

28. The apparatus of claim 27 wherein said resistance means comprises a second fixed resistor and said second fixed resistor is connected to said first and second network terminals.

29. The apparatus of claim 27 wherein said resistance means comprises a second fixed resistor and said second fixed resistor is connected to said first network terminal and said second terminal of said second thermally responsive member.

* * * * *